United States Patent [19]
Amos

[11] 3,902,820
[45] Sept. 2, 1975

[54] FLUID COOLED TURBINE ROTOR BLADE
[75] Inventor: David J. Amos, Wallingford, Pa.
[73] Assignee: Westinghouse Electric Corporation, Pittsburgh, Pa.
[22] Filed: July 2, 1973
[21] Appl. No.: 376,035

[52] U.S. Cl. .................................................. 416/97
[51] Int. Cl.² ........................................... F01D 5/18
[58] Field of Search ....................... 416/92, 95–97, 416/96 A, 97 A

[56] References Cited
UNITED STATES PATENTS

| | | | |
|---|---|---|---|
| 3,094,310 | 6/1963 | Bowmer | 416/96 X |
| 3,574,481 | 4/1971 | Pyne et al. | 416/97 X |
| 3,623,825 | 11/1971 | Schneider | 416/96 |
| 3,628,880 | 12/1971 | Smuland et al. | 416/97 X |
| 3,628,885 | 12/1971 | Sidenstick et al. | 416/97 |
| 3,635,587 | 1/1972 | Giesman et al. | 416/97 |
| 3,700,348 | 10/1972 | Corsmeier et al. | 416/95 X |
| 3,707,750 | 1/1973 | Klass | 416/96 A UX |
| 3,781,129 | 12/1973 | Aspinwall | 416/97 |
| 3,782,852 | 1/1974 | Moore | 416/97 |
| 3,806,274 | 4/1974 | Moore | 46/97 |
| 3,806,276 | 4/1974 | Aspinwall | 416/97 |

FOREIGN PATENTS OR APPLICATIONS

| | | | |
|---|---|---|---|
| 1,471,701 | 1/1967 | France | 416/96 |
| 701,154 | 12/1953 | United Kingdom | 416/92 |
| 1,222,565 | 2/1971 | United Kingdom | 416/96 A |

Primary Examiner—Everette A. Powell, Jr.
Attorney, Agent, or Firm—G. H. Telfer

[57] ABSTRACT

A hollow rotating gas turbine blade having an insert, with cooling fluid passageways provided between the insert and the blade. The blade also has bifurcated roots. One side of each bifurcated root of each blade shares a side entry channel in a rotor disc with one side of a bifurcated root portion of an adjacent blade.

A plenum chamber is provided in the area between the intersection of the bifurcated roots and the radially outer portion of each steeple that is disposed between adjacent channels. The plenum chamber provides a passageway for cooling fluid supplied from a source, to enter a plurality of orifices between the inserts and the cooled blade.

8 Claims, 12 Drawing Figures

PATENTED SEP 2 1975 3,902,820

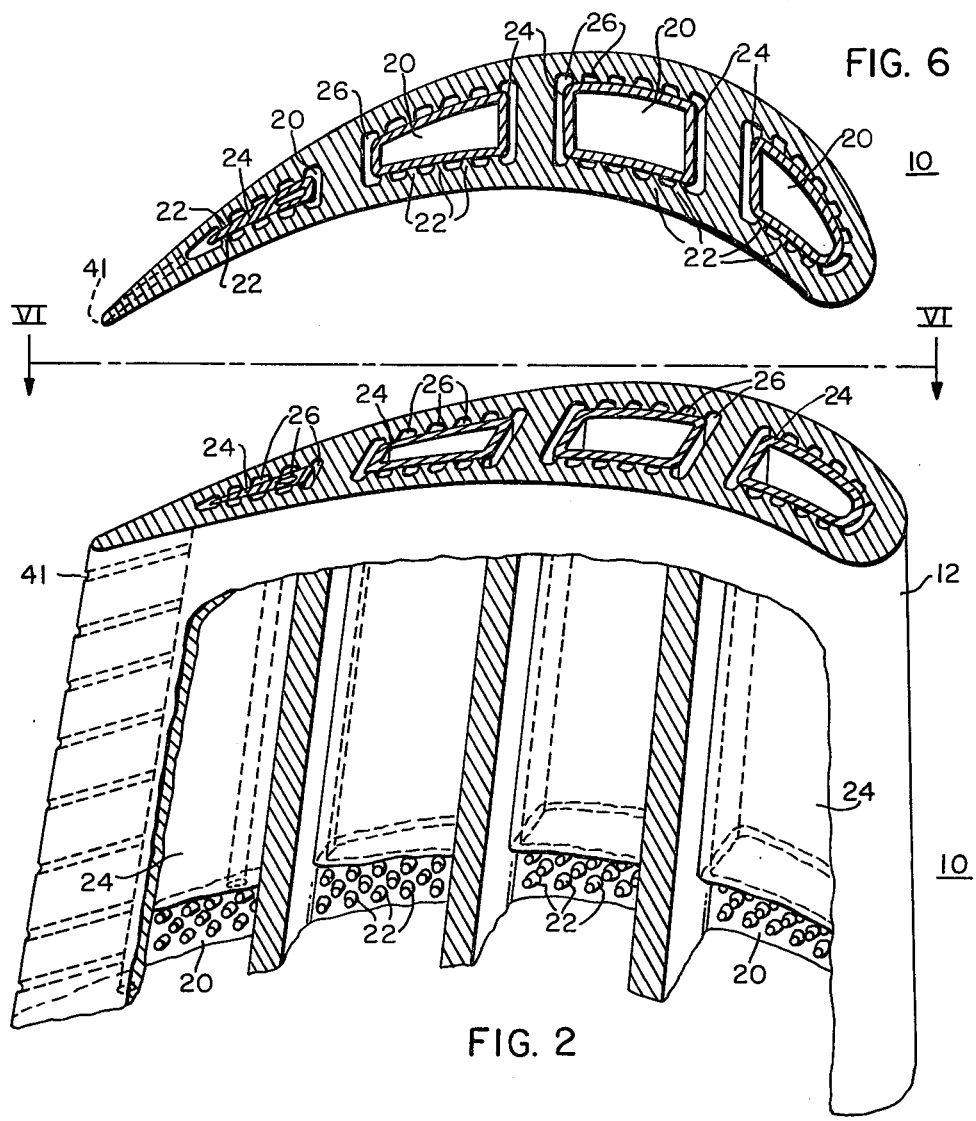
FIG. 6
FIG. 2
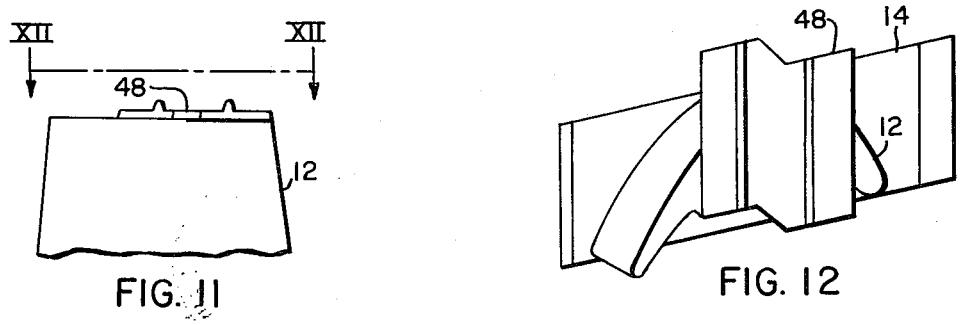
FIG. 11
FIG. 12

FLUID COOLED TURBINE ROTOR BLADE

BACKGROUND OF THE INVENTION

1. Field of the Invention:

This invention relates to turbine blades and more particularly to cooled gas turbine rotor blades.

2. Description of the Prior Art:

Cooling of gas turbine blades is often done by forcing a cooling medium through radially directed passageways in a solid blade, or by disposing a solid insert within a hollow gas turbine blade, then by forcing a cooling medium through passageways between the hollow blade and the solid insert. Neither of these arrangements is satisfactory from the standpoint of cooling a high temperature turbine blade, or minimizing the centrifugal forces and related stresses that are created in long turbine blades, having large masses.

Turbines are now being designed to run at much higher temperatures, and to produce a higher power output. A higher power output is accomplished, by for example raising the inlet temperature and by increasing the physical size of the rotor and the blades. As the blades get longer, the stresses caused by centrifugal forces are greater, and rotational velocities are much higher than those of the smaller turbines presently in use. A stronger, more exotic blade material might help, but high stresses in the rotors and blades still present a problem. The exotic metals are more expensive than those in common use and hence, are less desirable. The objects of the present invention are to overcome these disadvantages of the prior art.

SUMMARY OF THE INVENTION

In accordance with one embodiment of this invention, cooled gas turbine blades, each mounted in a side entry channel on a rotor disc periphery, has several hollow radially disposed cavities, and has a chamber-like insert disposed in each of the hollow cavities. A plurality of "pin fins" extend from the inner walls of each of the turbine blade cavities to the walls of the inset. The space therebetween defines a turbulent fluid flow path for cooling fluid passing through the blade. The radially inner end of the insert is sealed to prevent cooling fluid from entering the internal portion of the insert.

The turbine blade has a bifurcated root, divided along its longitudinal axis. Adjacent split root portions of the bifurcated roots of adjacent turbine blades abut of each other and share common side entry channels on the turbine rotor. Each side entry channel is defined by and separated from adjacent channels by steeples. The area between the radially outermost portion of each steeple and the area of intersection between the split roots, defines a plenum chamber. This plenum chamber is a conduit for cooling fluid passing from a source, into the orifices of the radially directed cooling fluid passageways through the blades.

BRIEF DESCRIPTION OF THE DRAWINGS

FIG. 2 is a perspective view of an air foil portion of a cooled rotating gas turbine blade, parts of the blade being broken away to show the internal construction;

FIG. 6 is a sectional view taken substantially along lines VI—VI of FIG. 2, showing an embodiment of the inserts and cavities;

FIG. 11 is a side elevational view of a portion of a blade showing an air foil shroud; and, FIG. 12 is a view taken along lines XII—XII of FIG. 11.

DESCRIPTION OF THE PREFERRED EMBODIMENTS

Figure 1:
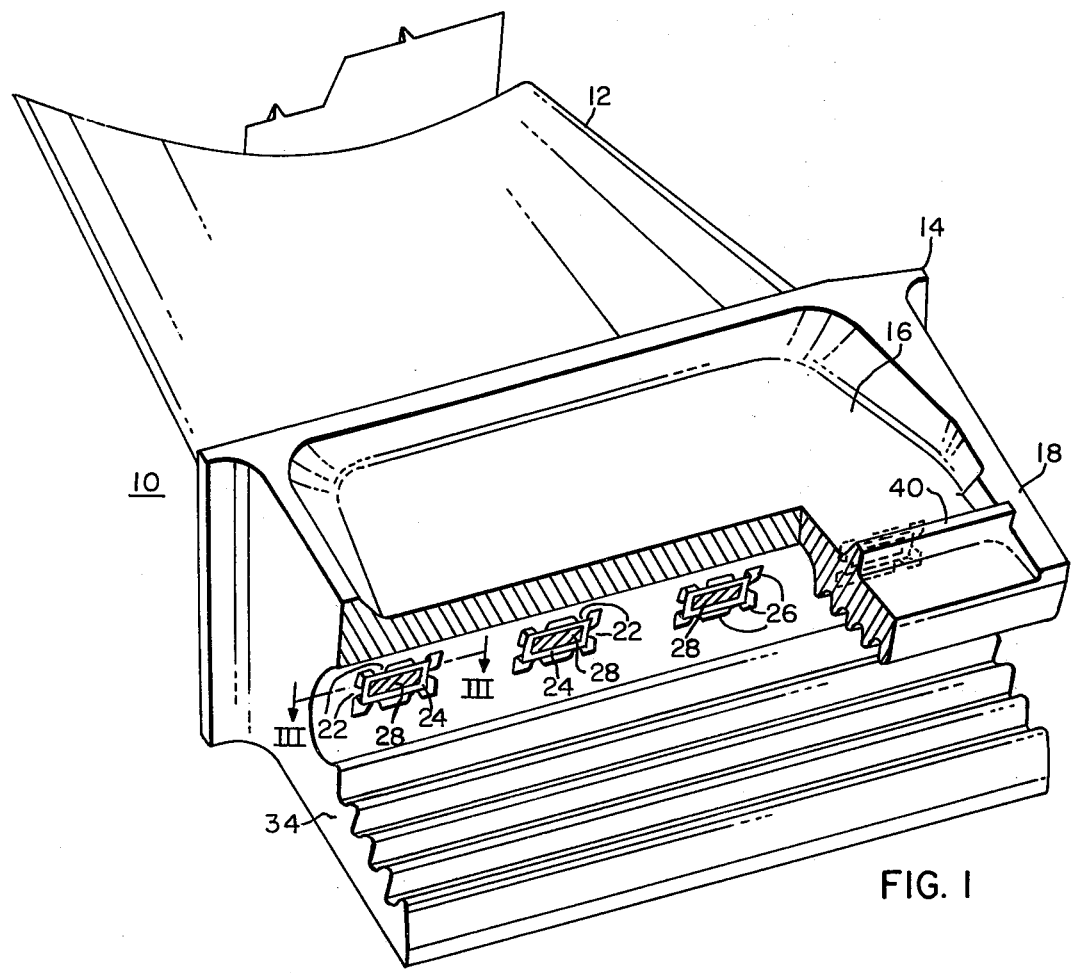
FIG. 1 is a perspective view, partially broken away and in section, of a cooled rotating gas turbine blade constructed in accordance with the present invention.

Referring to the drawings in detail, and particularly to FIGS. 1 and 2, wherein a cooled turbine blade 10 has an air foil portion 12, a platform 14, shank portion 16, and an axially directed bifurcated root portion 18.

The blade 10 has several generally radially disposed cavities or chambers 20, as shown in FIG. 2. The walls of these cavities 20 have a pattern of "pin-fins" or "plateaus" 22 disposed thereon. An insert 24 is disposed within each of the cavities 22. The walls of the inserts 24 are generally in contact with the tips of the pin fins 22. The area between the outer walls of the inserts 24 and the inner walls of the cavity 20 provide coolant fluid flow passageways 26. The pin fins 22 create a turbulent flow of cooling fluid in the passageways 26, as the fluid passes from the root 18 out through the air foil portions 12 of the blade 10. A turbulent flow of cooling fluid increases the rate of heat transfer over that of a laminar flow. The heat transfer rate is also increased because the pin fins 22 in the cavities 20 are an integral part of the wall of the cavity 20. The heat removal is therefore very efficient, because the pin fins 22 extend off the inner walls of the hottest part of the blade 10, that is, they extend inwardly off the walls of the air foil 12.

Figure 4:
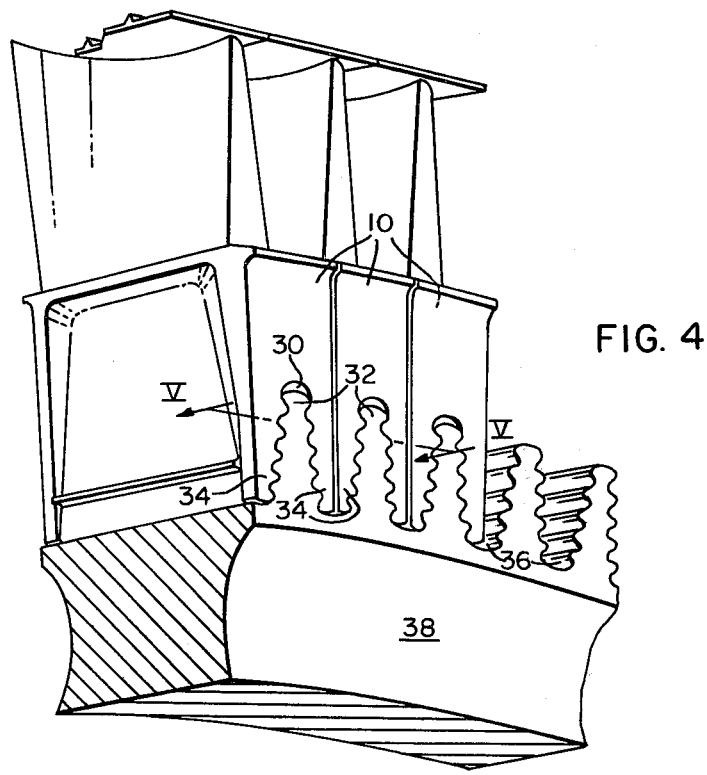
FIG. 4 is a perspective view of several blades mounted in a portion of a rotor disc.

The cooling fluid enters the blade 10 through the passageways 26. Orifices for admitting cooling fluid to the passageways 26 are disposed at the junction of the bifurcated roots 18, as shown in FIGS. 1 and 4.

Figure 3:
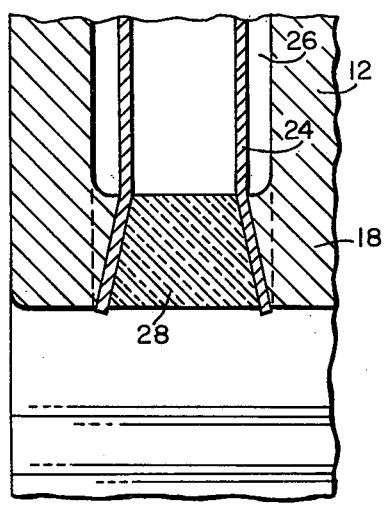
FIG. 3 is a sectional view taken along the lines III—III of FIG. 1.

A wedge plug 28, as shown in FIG. 3, prevents passage of cooling fluid through the internal portion of the insert 24, where fluid flow would be ineffective for heat transfer purposes. The plug 28 also restrains the insert 24 from radial movement, because the wedging action of the plug 28 creates a strong resistance to dislocation of the insert 24. The coolant fluid enters the passageways 26 through orifices adjacent a plenum chamber 30. The orifices are the radially inward end of the passageways 26. The plenum chamber 30 is supplied with cooling fluid from a source, not shown, disposed at the ends of the chamber 30. As shown in FIG. 4, each plenum chamber 30 is the volume between the apex of each bifurcated root portion 18 and each steeple 32 over which it is mounted.

The bifurcated root 18, or "saddle root" has leg portions 34 disposed about each side of the steeple 32. Contiguous leg portions 34 of adjacent blades 10 are mounted together in common side entry channels 36 in a rotatable rotor disc 38. The side entry channels 36 secure each blade 10 and prevent their radial displacement in the rotor disc 38.

Figure 5:
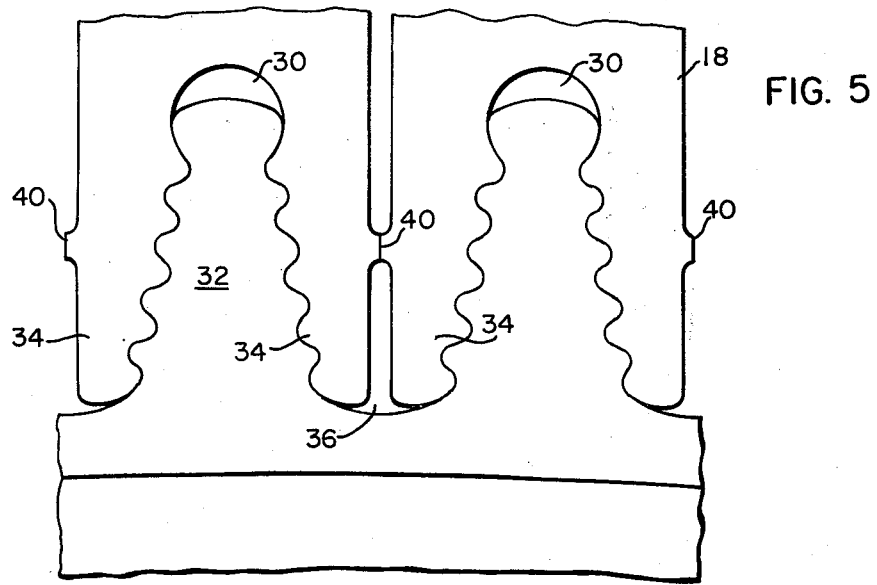
FIG. 5 is a view taken along lines V—V of FIG. 4.

Since one leg portion 34 of each bifurcated root 18 shares a side entry channel 36, with another leg portion 34 of an adjacent blade 10 the blades are in contact with one another. A load strip 40, shown in FIG. 5, is axially disposed on each radially directed side of each root leg 34, directed toward the adjacent blade, to reduce undesirable bending stresses which could occur if adjacent blades incorrectly touch one another. That is, the stresses would occur if adjacent blades 10 were not perfectly aligned or in full flat contact with one another, or were touching at only one point. The bumper-like load strips 40 on each side of the blade root 18 create a line of contact between adjacent blades 10. This line of contact between the strips 40 facilitates a reduction of bending stresses across critical areas of each leg 34.

A preferred pattern of inserts is shown in FIG. 6, wherein each cavity 20 has an insert 24 and the walls of each of the cavities 20 have their associated pin fins 22. The trailing edge cavity 20 has several generally axially disposed trailing edge fluid exit holes 41.

Figure 7:
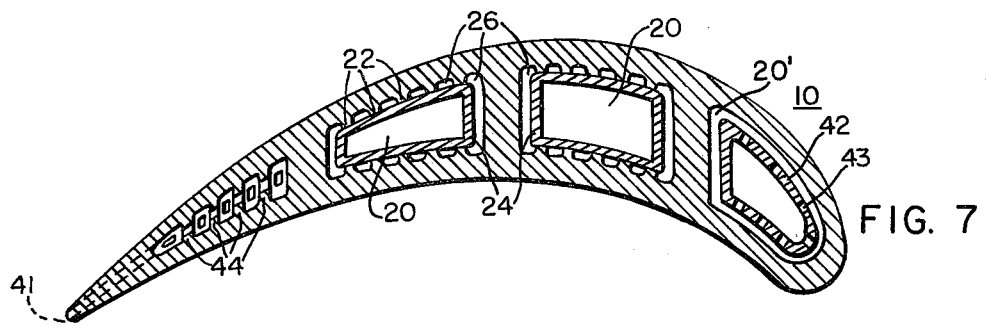
FIG. 7 is a view similar to that of FIG. 6 of an alternative embodiment of the leading and trailing edge insert arrangements.
Figure 8:
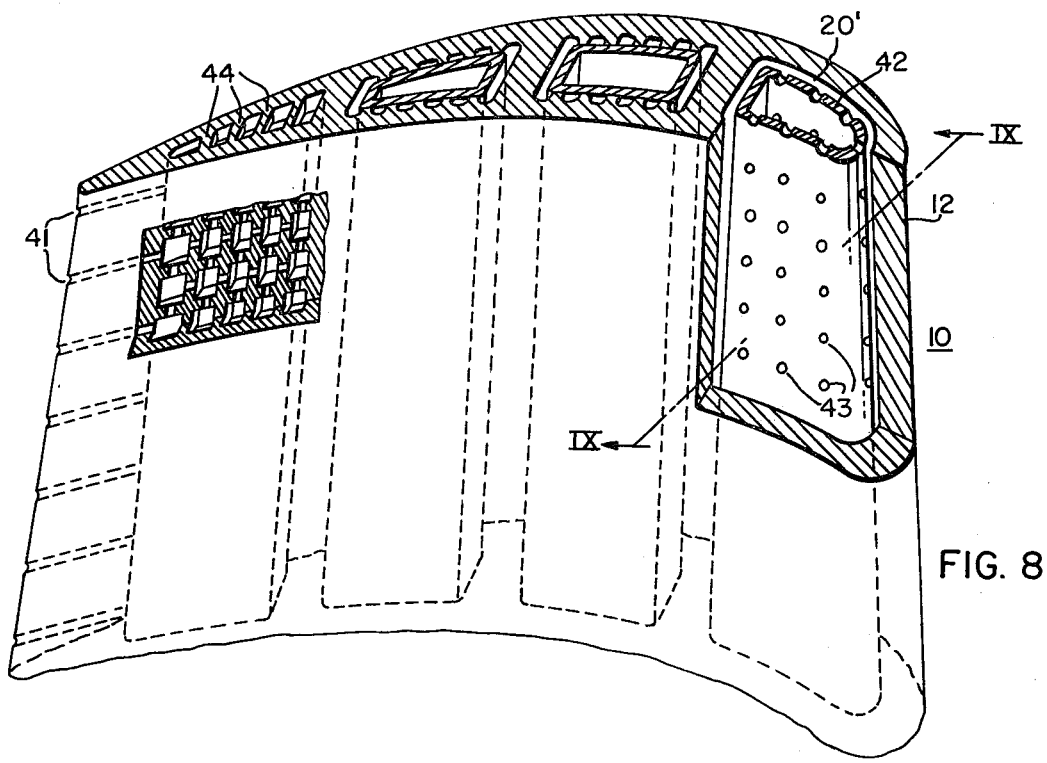
FIG. 8 is a partial perspective view of the leading edge insert and trailing edge configuration of FIG. 7 in a gas turbine blade.

An alternative insert configuration is shown in FIG. 7, wherein the leading edge of the blade 10 is cooled by a perforated insert 42. The perforated insert 42, as more clearly shown in FIG. 8, has a plurality of holes 43 therein; which cause the pressurized cooling fluid to impinge upon the walls of the leading edge cavity 20'. The pin fins 26 and wedge plug 28 are absent in this embodiment of the leading edge cavity 20'. The cavity nearest the trailing edge of the blade has pin fins 44 extending through it between which cool and passages are defined without the use of an insert.

Figure 9:
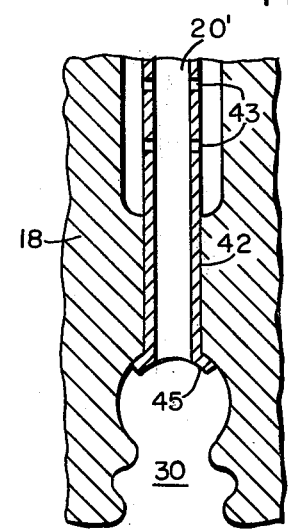
FIG. 9 is a partial sectional view taken along lines IX—IX of FIG. 8.

In FIG. 9, the inner end of the insert 42 is shown attached to the root 18. No wedge plug is used to hold the insert 42 in its leading edge cavity 20'. The insert 42 has a lip 45 which is secured to the radially outer portion of chamber 30, which is the apex of the root 18. Cooling fluid in this arrangement travels internally through the perforated insert 42, and is forced out the holes 43, to impinge cooling fluid upon the walls of the leading edge cavity 20'. A shroud 48, shown in FIGS. 11 and 12, seals the radially outer portion of the cavity 20' to insure pressure therein.

Figure 10:
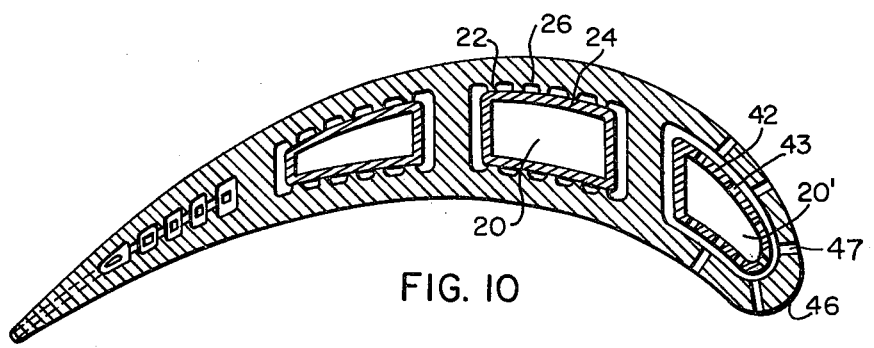
FIG. 10 is a sectional view of another alternative embodiment of the leading edge insert arrangement.

A similar impingement arrangement is shown in FIG. 10, as was shown in FIG. 9, for cooling the leading edge of the air foil 12, except that in this embodiment, the air foil 12 has a leading edge 46 which has a plurality of orifices 47 through which the cooling fluid is forced, after the fluid impinges upon the surfaces of the cavity 20'. As the cooling fluid passes out these orifices 47 it provides additional cooling to the leading edge 46 of the air foil 12. The leading edge 46 could also be made of a porous material. The cooling would then be transpirational. The coolant fluid would therefore effuse through the surface 46 after impingement on the walls of the cavity 20'. The heat transfer rate of the air foil 12 would be effectively increased in this manner.

The shroud 48 maintains the pressure of the cooling fluid in the cavity 20' by sealing the radially outer portion of the cavity 20', and the air foil 12. This shroud 48 covers the open end of cavity 20' and maintains the cooling at a sufficient pressure for forcing the fluid through the orifices 43, causing impingement of the cooling fluid upon the cavity walls 20'. The cooling fluid would then escape through the orifices 47 or effuse through the porous material of the leading edge surface 46 and cause transpirational cooling.

This invention therefore, shows a novel fluid flow path arrangement that is easy to manufacture. The invention also defines a novel method for mounting rotating cooled gas turbine blades. The bifurcated root is necessary to be able to easily install the cooling fluid path generating inserts, and to create a chamber for supplying the cooling fluid through the passageways adjacent to the inserts.

I claim as my invention:

1. In a rotor construction, a rotor disc having a plurality of generally axially extending side entry channels in its periphery, between which are defined steeples, said channels having cooled rotor blades mounted therein, said blades having a root portion, a shank portion, and an air foil portion, said blades each having a plurality of generally radially directed chambers extending through said air foil portion, at least one of said chambers being in the intermediate portion of said blade away from both the leading and trailing edges thereof and having walls with a plurality of pin fins disposed thereon, at least one of said pin finned chambers having an insert therein, said insert being a hollow, closed element with a shape conforming substantially to said chamber configuration and being spaced from the inner surface of said chamber, the volume between the outer side of the walls of said insert and the walls of said pin finned chamber defining turbulent cooling fluid flow passageways, means for injecting cooling fluid into said passageways, said fluid exiting said passageways at the radially outer end of said blade, said turbulent cooling fluid flow passageways providing maximum heat transfer from said blade to said fluid, said root portion of said blade being axially bifurcated, the intersection of said bifurcated root portions defining the radially outward portion of a plenum chamber for the passage of cooling fluid into said blades, the radially outer portion of the steeples comprises the radially inner portion of the plenum chamber, the bifurcated root being mounted about said steeple, said insert being secured within each of said blades by a wedge plug inserted within the radially inner end of said insert, said cooling fluid from said plenum chamber entering passageways through an arrangement of orifices disposed between said insert and walls of said chamber to promote the cooling of said blade.

2. The rotor construction as recited in claim 1, wherein the blade has a chamber disposed in its leading edge, said leading edge chamber having pin fins disposed on its walls, said leading edge chamber having an insert disposed therein.

3. The rotor construction as recited in claim 1, wherein the blade has a chamber disposed in its trailing edge, said trailing edge chamber having pin fins disposed on its walls, said trailing edge chamber having an insert disposed therein, and said trailing chamber has several generally axially disposed trailing edge fluid exit holes extending therethrough.

4. The rotor construction as recited in claim 1, wherein the radially inner edges of adjacent blade roots are disposed in the same side entry channel.

5. The rotor construction as recited in claim 1, wherein said adjacent blade roots each have an axially disposed ridge on their radially directed sides, said axially disposed ridges of adjacent blades abutting one another to reduce bending stresses across the blade root, which would occur due to misalignment of contiguous blades.

6. The rotor construction as recited in claim 1, wherein said blade has a chamber disposed in its leading edge, said leading edge chamber having an insert disposed therein, said insert being perforated, means for injecting cooling fluid internally through the insert which fluid will be jetted out said perforations to impinge upon the walls of said chamber, said blade having a trailing edge chamber with pin fins disposed completely thereacross.

7. The rotor construction as recited in claim 1, wherein said blade has a chamber disposed in its leading edge, said leading edge chamber having an insert disposed therein, said insert being perforated, means for injecting cooling fluid internally through the insert which fluid will be jetted out said perforations to impinge upon the walls of said chamber, said leading edge chamber having passageways therethrough for additional cooling thereof, said means for injecting cooling fluid comprising said insert having an open radially inner end for the flow of cooling fluid therethrough.

8. The rotor construction as recited in claim 1, wherein said leading edge is constructed from a porous material, said porous material permitting the effusing of coolant fluid therethrough.

\* \* \* \* \*